United States Patent

[11] 3,565,435

| [72] | Inventor | Fred B. Bear |
| | | Lake St., Grayling, Mich. 49738 |
| [21] | Appl. No. | 778,547 |
| [22] | Filed | Nov. 25, 1968 |
| [45] | Patented | Feb. 23, 1971 |

[54] DRUG DISPENSING HUNTING ARROW
8 Claims, 6 Drawing Figs.

[52] U.S. Cl. .................................................... 273/106.5,
43/6; 102/92; 128/215
[51] Int. Cl. .................................................... F41b 5/02,
A61m 5/00
[50] Field of Search .................................... 273/106.5,
106.5 (B), 106.5 (D); 128/215; 43/6; 102/92

[56] References Cited
UNITED STATES PATENTS

| 3,066,940 | 12/1962 | DeLonais | 273/106.5(B) |
| 3,457,921 | 7/1969 | Waldeisen | 102/92X |

Primary Examiner—George J. Marlo
Assistant Examiner—Paul E. Shapiro
Attorneys—Emory L. Groff and Emory L. Groff, Jr.

ABSTRACT: A hunting arrow having means located between the head and shaft for the automatic dispensing of a tranquilizing composition upon entry of the forward part of the arrow into the flesh of game. A flexible sheath is stripped back by the flesh to expose the composition to the animal tissue thus ensuring a humane kill.

PATENTED FEB 23 1971 3,565,435

INVENTOR.
Fred B. Bear
BY Emory L. Groff Jr.
ATTORNEY

DRUG DISPENSING HUNTING ARROW

This invention relates generally to arrows for use by archers and more particularly to arrows especially adapted for use by bow hunters in the pursuit of game.

In the case of bow hunting it is not at all too uncommon for the hunter to direct an arrow into the flesh of the quarry without the animal actually being brought to the ground at or near the point of impact. This situation may be readily understood when one realizes that an extreme amount of skill is required in order to consistently achieve instant kills. Thus it follows that many of the arrows directed towards moving game and which inflict mortal wounds upon the animal may fail to fell the quarry in the immediate vicinity with the result that the mortally wounded animal will endure unnecessary suffering and may escape to an inaccessible location during its last moments of life.

During the past few years bow hunting has substantially increased in popularity and all sportsmen participating in this activity seek a clean kill and deplore the unnecessary suffering and possible escape of an otherwise mortally wounded animal.

The present invention proposes a hunting arrow having means insuring a more rapid and humane killing of the game and includes an arrow incorporating, with the arrowhead, means for dispensing a tranquilizer or drug into the flesh of the animal automatically as the arrowhead is imbedded into the animal's flesh.

By this arrangement it will be understood that none of the challenge of the hunt is removed but rather a quicker and more humane kill is achieved following the bow hunter's stalking of the quarry and subsequent skillful release of the arrow.

Accordingly, one of the primary objects of the present invention is to provide a hunting arrow including means for releasing a tranquilizer as the arrowhead becomes imbedded within the game to insure a quick humane kill.

Another object of the present invention is to provide a hunting arrow having tranquilizer dispensing means associated therewith including means for automatically releasing the tranquilizer as the arrowhead passes into the animal's flesh.

Still another object of the present invention is to provide a hunting arrow having means for dispensing a tranquilizer which means may be reused an unlimited number of times.

With these and other objects in view which will more readily appear as the nature of this invention is better understood, the invention consists of the novel construction, combination and arrangement of parts hereinafter more fully described, illustrated and claimed.

The preferred and practical embodiments of the invention are shown in the accompanying drawing in which.

Similar reference characters designate corresponding parts throughout the several figures of the drawing.

Figure 1:
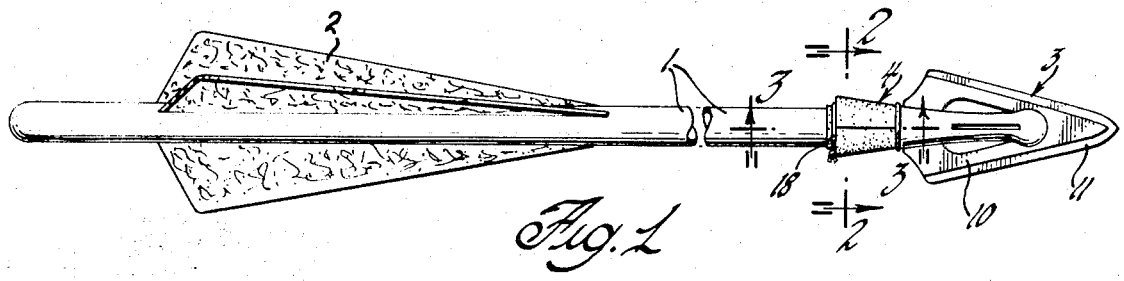
FIG. 1 is a side elevation of the hunting arrow according to the present invention.

Referring now to the drawings, particularly to FIG. 1, it will be seen that the hunting arrow forming the present invention comprises a shaft 1 having at its rear end thereof conventional fletching 2 and any suitable form of arrowhead 3 at the forward end thereof.

Disposed at the forward end of the shaft 1 and immediately behind the arrowhead 3 are means for dispensing suitable tranquilizing substances or narcotic agents into the flesh of the animal after the arrowhead has been imbedded therein. This dispensing means comprises a pod assembly, generally designated 4, and includes novel means for encapsulating the tranquilizing composition for retention therein during storage of the arrow and during flight of the arrow while on its way to the target. As will be seen from the description immediately following, the placing of the forward portion of the arrow into the flesh of the game initiates the release of the tranquilizer into the flesh of the animal where it is immediately assimilated.

Figures 2, 4:
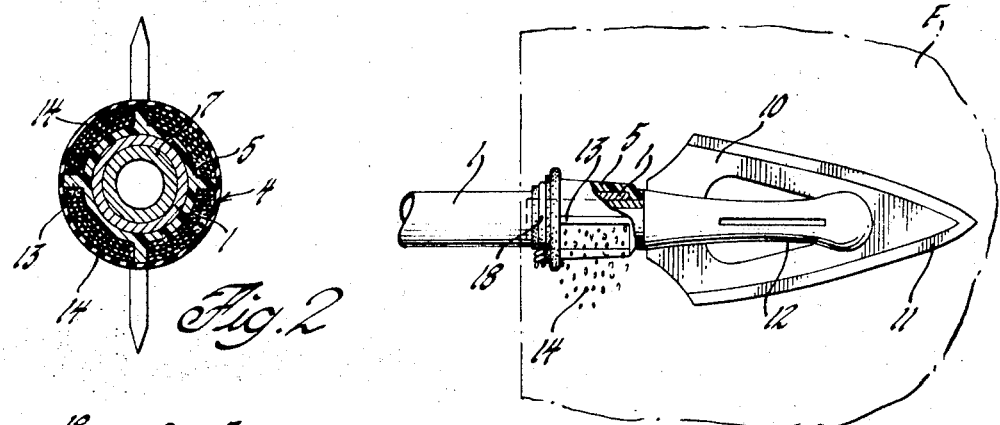
FIG. 2 is a vertical sectional view taken along the line 2–2 of FIG. 1.
FIG. 4 is a side elevation, partly in section, of the forward end of the arrow as it appears when imbedded in the flesh of an animal.
Figure 3:
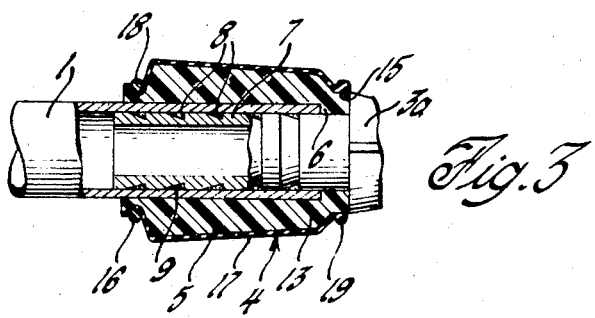
FIG. 3 is a partial longitudinal sectional view taken along the line 3–3 of FIG. 1 and illustrates the attachment of the tranquilizer dispensing pod to the forward end of the arrow shaft.
Figure 5:
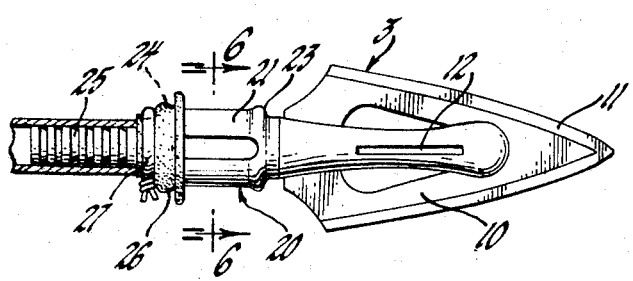
FIG. 5 is a side elevation, partly in section, of a modification of the hunting arrow shown in FIGS. 1–4.
Figure 6:
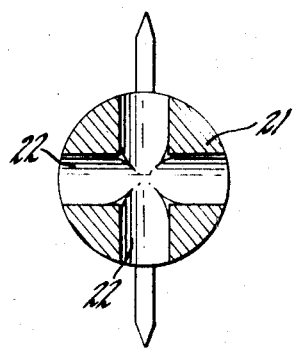
FIG. 6 is a vertical sectional view along the line 6–6 of FIG. 5.

In the form of the invention illustrated in FIGS. 1–4, the pod assembly includes a body member or sleeve 5 having a smooth inner peripheral surface adapted to slide over the exterior of the forward portion of the arrow shaft 1 as will be most clearly seen in FIGS. 2 and 3. A stop shoulder 6 at the forward portion of the sleeve 5 provides a reduced inner diameter to the arrow shaft 1.

The sleeve 5 is firmly retained upon the forward end of the shaft by means of the base 3a of the arrowhead which overlies at least a portion of the front of the sleeve. The arrowhead 3 is secured to the end of the shaft 1 by means of a tang 7 attached thereto and concentrically disposed within the hollow shaft 1 and having an outer diameter approximately equal to the inner diameter of the hollow shaft. Disposed around the outer surface of the tang 7 are a plurality of inclined peripheral notches 8. It will be seen that the pod assembly may be permanently secured to the forward end of the arrow shaft by application of any suitable type of adhesive composition 9 to the notches 8 prior to the insertion of the tang 7 into the space within the hollow shaft.

Of course, any suitable type of arrowhead may be used together with the present invention. As shown in the drawings, the arrowhead 3 comprises a single large blade 10 having two sharp edges 11 and adapted to receive a smaller transverse blade (not shown) through the slot 12. Regardless of the form of the arrowhead used with the present invention it will be understood that the arrowhead may be integrally attached to the forward part of the tang 7 and sleeve 5 by any suitable means so that the combined assembly of the pod and arrowhead may be assembled to the forward portion of an arrow shaft 1 in a single operation as previously described. Alternatively, the sleeve 5 may be integrally formed with the tang 7.

A plurality of fins 13 longitudinally disposed with respect to the shaft 1 extend radially from the sleeve 5 to provide a plurality of tranquilizer retaining cavities 14 therebetween. As is most clearly seen in FIGS. 1, 3 and 4, the outer edges of the fins 13 are inclined towards the center axis of the arrow shaft 1 as they extend towards the arrowhead 3. Each of the fins 13 terminates at its forward end at a point which is of substantially lesser diameter than the outer edge of the fins and comprises a sealing ledge 15. At the rear of the outer edges of the fins 13 there is another reduced diameter portion forming a groove 16.

As will be seen from FIG. 2, the cavities 14 are adapted to retain tranquilizing crystals or powder in a quantity sufficient to humanely bring about the death of the animal being hunted. Removable cover means for encapsulating the tranquilizing composition within the cavities 14 is provided in the form of a sheath 17 which is adapted to be automatically stripped back from the fins 13 as the forward portion of the arrow is sunk into the flesh of the game. This sheath 17 may be of any suitable stretchable rubberlike material and comprises a rubber tube or sleeve which is attached to the rear of the pod assembly 4 by means of a clamping or retaining ring 18 which clamps or secures the rear of the sheath within the aforementioned groove 16, as will be most clearly seen in FIG. 3. The sheath is thereafter rolled forwardly over the edges of the fins 13 and securely engages the forwardmost sealing ledge 15 immediately to the rear of the arrowhead 3. If desired, a suitable resilient constrictor 19 may be formed with the forward edge of the sheath 17 to assist in maintaining a tight seal at the ledge 15 and to facilitate the stripping of the sheath at the time the pod assembly enters into the flesh of the game as will be described shortly hereafter.

In order to load the above described pod assembly, the sheath is rolled rearwardly over the outer edges of the fins 13 to the position as shown in FIG. 4 and then, with the arrow clamped in a vertical position the bow hunter stretches the sheath outwardly as the tranquilizer composition is sprinkled into the cavity formed between the sheath and the sleeve 5. Any suitable type of tranquilizer may be utilized which will accomplish the desired result. One composition which has been found to be satisfactory is succinyl choline chloride which may be obtained in crystal form. The present construction of the pod assembly permits of the application of only a small amount of tranquilizer, for example, 8 milligrams, which is enough to kill a deer, while at the same time the sheath 17 may be stretched outwardly enough to encapsulate 500 milligrams of the tranquilizer which is enough to kill an elephant. It will be understood that when the smaller amounts of tranquilizer are used the sheath will not be stretched beyond the outer edges of the fins 13 and since the size of the sheath is such that when there is no tranquilizer in the cavities 14 it will be stretched tightly from the outer edge of one fin to the outer edge of the adjacent fins. In the view of FIG. 2, it will be seen that the sheath 17 is circular, which would be the position it would assume only when the cavities 14 were filled to such capacity that the sheath would be bulged outwardly as shown therein.

The automatic stripping of the sheath will be most readily apparent from a review of FIGS. 3 and 4 which illustrate the sheath 17 in its closed and opened positions, respectively. As the arrowhead 3 enters into the animal's flesh, which is diagrammatically illustrated by F in FIG. 4, the pod assembly 4 follows the arrowhead into the animal. It will be understood that as the forward portion of the pod 4 enters the animal, the flesh will strike the forward edge of the sheath 17 in the vicinity of the contrictor 19 thereby causing a rearwardly stripping of the sheath 17 as the fins 13 continue into the animal. With the pod assembly 4 completely imbedded into the animal the sheath 17 will be rolled to the rearward limits of the fins 13 thereby uncovering and releasing all of the tranquilizer composition contained within the cavities 14, it following that the tranquilizer will be instantaneously assimilated by the animal to achieve the desired obvious results.

In the modification illustrated in FIGS. 5 and 6 a pod assembly, generally designated 20, is shown comprising a body section 21 having a pair of transversely disposed tranquilizer cavities 22 arranged at right angles to one another and crossing at the longitudinal center axis of the pod assembly. In this manner, from FIG. 6 it will be seen that four different openings are provided leading to the cavities 22 at equidistant points about the outer periphery of the body section 21. At the forward edge of the body section 21 is a sealing ridge 23 formed of a larger diameter portion of the body section which ridge 23, then drops off to a substantially lesser diameter at a point forward thereof just to the rear of the arrowhead 3. A similar larger diameter portion is formed at the rear of the body section 21 and defines a retaining ridge 24.

Extending rearwardly from the retaining ridge 24 is a notched tang 25 somewhat similar to the tang 7 described in connection with the previous embodiment of the invention. In assembling or loading the pod assembly 20, a sheath 26 is placed thereover and retained at the rear thereof by means of a ring 27 secured immediately to the rear of the retaining ridge 24. Filling of the pod assembly 20 with the tranquilizer composition is accomplished in the same manner as with the previous embodiment, that is, with the arrow clamped to a vertical position, the bow hunter stretches the sheath 26 as the tranquilizer crystals are poured into the cavities 22. It will be understood that if a maximum load is desired for the pod assembly, then the tranquilizer crystals will not only completely fill the cavities 22, but may also be encapsulated between the retaining ridge 24 and sealing ridge 23 and the inner surface of the sheath 26. With the desired measure of tranquilizer composition deposited within the pod assembly, the sheath 26 is rolled forwardly of the sealing ridge 23 and by its own resilience securely retains all the tranquilizer therewithin.

The operation of this latter form of pod assembly is similar to the previously described structure in that as the arrowhead 3 enters the flesh of the animal and continues therewithin the forward edge of the sheath 26 will be stripped and rolled rearwardly during the progress of the arrow into the animal, which action uncovers and releases the previously encapsulated tranquilizer.

It is to be understood that the invention is not limited to the specific features shown, but that the means of construction herein disclosed comprise the preferred forms of several modes of putting the invention into effect, and the invention is therefore plain in any of its forms of modifications within the legitimate and valid scope of the appended claims.

I claim:

1. In an arrow having an arrowhead fixed to an arrow shaft, drug dispensing means disposed between said arrowhead and shaft, said means comprising, a body member fixedly attached to and abutting the forward portion of said shaft and provided with an outer periphery of greater diameter than the periphery of said shaft, said body member including a drug retaining cavity fully opening through said body member periphery, cover means overlying said body member to retain a drug within said cavity, and said cover means comprising an elastomeric sheath whereby, as the arrow is imbedded into an animal's flesh, said sheath is progressively stripped back by said flesh to expose said cavity and release said drug therefrom.

2. In an arrow, drug dispensing means disposed between the arrowhead and arrow shaft, said means comprising, a body member disposed in abutting relationship against the forward end of said shaft and including a plurality of drug retaining cavities therein, displaceable resilient cover means having forward and rearward portions and overlying said member to retain a drug within said cavities, means adjacent the rear of said body member securing said rearward portion of said cover means thereto, whereby, as the arrow is imbedded into the animal's flesh, said cover means is stripped back by said flesh progressively from said forward portion toward said secured rearward portion to expose said cavities and release said drug therefrom.

3. In an arrow, drug dispensing means disposed between the arrowhead and arrow shaft, said means comprising, a body member including a sleeve disposed over the forward end of said shaft, means limiting the rearward longitudinal displacement of said sleeve over said shaft, the outer surface of said sleeve providing at least one drug retaining cavity, a resilient overlying said cavity in said body member, means retaining the rear end of said sheath in tight engagement at the rearward end of said body member, means at the forward end of said body member adapted to provide a sealing engagement with the forward end of said sheath when overlying said cavity, whereby, as the arrow is imbedded into an animal's flesh, said sheath is stripped back by said flesh progressively from said forward end to said rear end to expose said cavity and release said drug therefrom.

4. An arrow according to claim 3, wherein, said shaft is hollow, and said arrowhead includes a cylindrical tang extending rearwardly into said hollow shaft.

5. An arrow according to claim 3, wherein, said body member is provided with at least a pair of longitudinally disposed radial fins, and said cavity is formed therebetween.

6. An arrow according to claim 5, wherein, the outer edges of said fins are inclined outwardly from the forward portion of said body member to the rear thereof, and said retaining means comprises a clamping ring engaging a peripheral groove in said body member.

7. In an arrow, drug dispensing means disposed between the arrowhead and arrow shaft, said means comprising, a body member having at least one drug retaining cavity therethrough, said body member having sealing and retaining ridges at the forward and rearward portions thereof respectively, a resilient sheath having forward and rear portions overlying said cavity in said body member, means retaining one end of said sheath in tight engagement adjacent said retaining ridge, whereby, as the arrow is imbedded into an animal's flesh, said sheath is stripped back from said sealing ridge by said flesh progressively from said forward portion to said rear portion to expose said cavity and release said drug therefrom.

8. An arrow according to claim 7, wherein, said body section is provided with a pair of transversely disposed cavities passing completely therethrough.

UNITED STATES PATENT OFFICE
CERTIFICATE OF CORRECTION

Patent No. 3,565,435      Dated February 23, 1971

Inventor(s) Fred B. Bear

It is certified that error appears in the above-identified patent and that said Letters Patent are hereby corrected as shown below:

In the heading, next line after the patent date, insert:

-- /73/ Assignee     Victor Comptometer Corporation, Chicago, Ill., a corporation of Illinois. --.

Signed and sealed this 8th day of June 1971.

(SEAL)
Attest:

EDWARD M. FLETCHER, JR.
Attesting Officer

WILLIAM E. SCHUYLER, J
Commissioner of Patent